United States Patent [19]

Karasudani

[11] 4,324,318
[45] Apr. 13, 1982

[54] DUST COVER

[75] Inventor: Yasuo Karasudani, Yokohama, Japan

[73] Assignee: Tokico Ltd., Kawasaki, Japan

[21] Appl. No.: 130,117

[22] Filed: Mar. 13, 1980

[30] Foreign Application Priority Data

Mar. 20, 1979 [JP] Japan ................................ 54-32492

[51] Int. Cl.³ .......................................... F16D 65/02
[52] U.S. Cl. .............................. 188/73.31; 188/73.44; 277/212 FB
[58] Field of Search .................... 188/72.4, 72.6, 73.3, 188/73.31, 73.44, 73.45; 277/212 FB

[56] References Cited

U.S. PATENT DOCUMENTS

| 3,612,225 | 10/1971 | Evans | 188/72.6 |
| 3,653,470 | 4/1972 | Travis | 188/72.6 |
| 3,952,840 | 4/1976 | Yamazaki et al. | 188/73.3 X |
| 4,074,795 | 2/1978 | Kondo et al. | 188/73.3 |

Primary Examiner—Duane A. Reger
Attorney, Agent, or Firm—Wenderoth, Lind & Ponack

[57] ABSTRACT

A dust cover formed of a tubular flexible material and provided between a shaft and a body member which has a bore rotatably receiving the shaft. One end of the dust cover sealingly engages with the outer circumference of the shaft and with the inner circumference of a counter-bored portion of the bore, and the other end of the dust cover sealingly engages with the outer circumference of the shaft.

3 Claims, 2 Drawing Figures

DUST COVER

BACKGROUND OF THE INVENTION

This invention relates to a dust cover for covering the gap between a bore of a body member and a shaft rotatably received in the bore thereby preventing the gap from the ingress of dusts, water or the like.

Conventionally, a generally tubular member formed of flexible material such as rubber or the like constitutes the dust cover with one end being secured to the body member and the other end being secured to the outer circumference of the shaft. The intermediate portion connecting the opposite ends is formed to have a narrow width and covers the outer circumference of the shaft projecting out of the bore. In the conventional dust cover the sealing function is effected only by the intermediate portion, thus, there are shortcomings such that the intermediate portion will sometimes be damaged, particularly, when the dust cover is incorporated in a vehicle brake system or the like wherein foreign articles such as stones or the like will be picked up from the surface of a road in running the vehicle and will impact against the dust cover and that the operation of the shaft in the main body will be impaired by rusts and the wear owing to the breakage in the sealingness.

SUMMARY OF THE INVENTION

The present invention provides a dust cover eliminating the shortcomings aforementioned and, according to the invention, one end of the dust cover sealingly engages with the inner circumference of the body member and also with the outer circumference of the shaft, thus, an additional sealing effect is attained by the one end thereby augmenting the sealing characteristics of the dust cover.

DETAILED DESCRIPTION OF THE PREFERRED EMBODIMENTS

Figure 1:
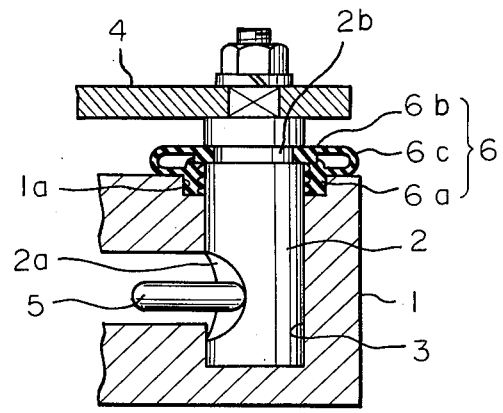
FIG. 1 is a partial sectional view of a disc brake device incorporating a dust cover according to the invention.

In the drawings, illustrated at 1 is a main body of a disc brake device. A shaft 2 is rotatably received in a bore 3 formed in the main body 1, and a lever 4 connected to a hand brake lever (not shown) is secured to one end of the shaft 2 projecting out of the bore 3. There is formed a recess 2a in the outer circumference of the shaft 2a to constitute an eccentric cam for actuating a rod 5. When the hand brake lever is operated to rotate the shaft 2, the rod 5 moves leftward in the drawing so as to press a friction pad (not shown) against a rotatable disc (not shown) thereby applying the braking action.

Figure 2:
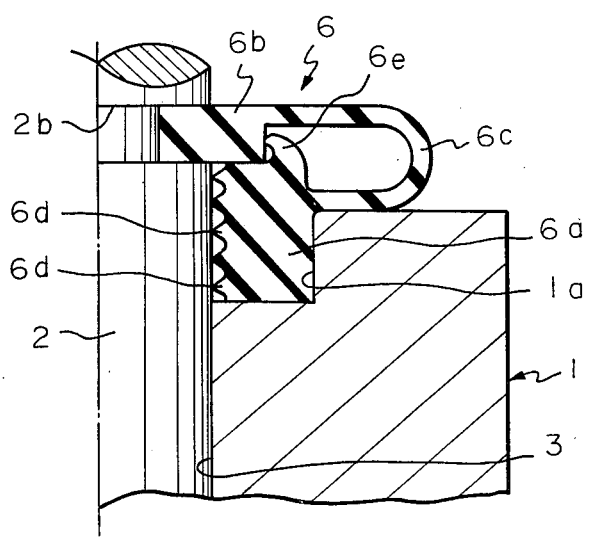
FIG. 2 is an enlarged view showing the essential portion of FIG. 1.

The gap between the main body 1 and the shaft 2 is sealed by a dust cover 6 according to the invention. As shown clearly in FIG. 2, there is formed a counterbored portion 1a in the outer end portion of the bore 3 of the main body 1, and one end section 6a of the dust cover 6 is received in the couterbored portion 1a such that the inner circumference of the end section 6a sealingly engages with the outer circumference of the shaft 2, and the outer circumference of the end section 6a sealingly engages with the inner circumference of the portion 1a. Preferably, the end section 6a abuts also with an annular shoulder defined between the counterbored portion 1a and the bore 3 so as to improve the sealing characteristics of the dust cover 6.

Another end section 6b of the dust cover 6 sealingly engages with an annular groove 2b which is formed in the shaft 2. The end sections 6a and 6b are connected by a narrow width intermediate portion 6c which covers and seals the gap between the shaft 2 and the bore 3 and is sufficiently flexible so as to permit the rotational movement of the shaft 2 with respect to the main body 1.

The annular groove 2b in the embodiment is located adjacent to the counterbored portion 1a of the main body 1 so that, in the assembled condition of the dust cover 6, the end sections 6a and 6b of the dust cover 6 contact lightly with one another in the axial direction, whereby the end section 6a can reliably be retained in the counterbored portion 1a by the other end section 6b without utilizing any retainers since the end section 6b is received in the annular groove 2b whereby the axial displacement of the end section 6b is restricted even when an axial force is applied thereon. On the inner circumference of the end section 6a there is formed a plurality of axially spaced annular projections 6d which improves the sealing characteristics between the end section 6a and the shaft 2 and reduces the rotational resistance of the shaft 2.

Further, in the embodiment, an annular lip portion 6e is formed on the end section 6a to project in the radial direction toward the outer circumference of the end section 6b, whereby the sealing function of the dust cover 6 can further be augmented.

The lip portion 6e may be formed on the end section 6b to extend toward the end section 6a.

As described heretofore, the dust cover according to the invention has a sealing portion, additional to the conventional narrow width intermediate portion, on one end section which sealingly engages with the outer circumference of the shaft and also with the inner circumference of the main body, therefore, the sealing characteristics of the dust cover can substantially be improved.

What is claimed is:

1. A dust cover formed of a tubular flexible material and provided between a shaft and a body member which has a bore fittingly receiving the shaft therein, one end of the dust cover sealingly engaging with the outer circumference of the shaft and with the inner circumference of the body member, the other end of the dust cover sealingly engaging with the outer circumference of a portion of the shaft projecting out of the body member, and an annular lip which is formed on either of said ends of the dust cover and engages with the other of said ends of the dust cover in the radial direction, and a connecting portion connecting said ends of the dust cover for covering the shaft and the body member.

2. A dust cover as set forth in claim 1 wherein a counterbored portion is formed in the outer end of said bore for sealingly receiving said one end of the dust cover, an annular groove is formed in the shaft for sealingly receiving said the other end of the dust cover, and the opposite ends of the dust cover abut with one another in the direction of the axis of the shaft.

3. A dust cover as set forth in claim 1 wherein a plurality of axially spaced annular projections is formed in the inner circumference of said one end of the dust cover.

* * * * *